US009317211B2

(12) United States Patent
Samanta et al.

(10) Patent No.: US 9,317,211 B2
(45) Date of Patent: Apr. 19, 2016

(54) SYSTEM AND METHOD OF LIFE MANAGEMENT FOR LOW ENDURANCE SSD NAND DEVICES USED AS SECONDARY CACHE

(71) Applicant: LSI Corporation, San Jose, CA (US)

(72) Inventors: Sumanesh Samanta, Bangalore (IN); Mohana Rao Goli, Bangalore (IN); Karimulla Sheik, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 167 days.

(21) Appl. No.: 14/268,591

(22) Filed: May 2, 2014

(65) Prior Publication Data
US 2015/0317090 A1    Nov. 5, 2015

(51) Int. Cl.
*G06F 3/06* (2006.01)
*G06F 12/02* (2006.01)

(52) U.S. Cl.
CPC ............ *G06F 3/0616* (2013.01); *G06F 3/0635* (2013.01); *G06F 3/0679* (2013.01); *G06F 12/0246* (2013.01); *G06F 2212/7204* (2013.01)

(58) Field of Classification Search
CPC ... G06F 3/0616; G06F 3/0679; G06F 3/0635; G06F 12/0246; G06F 2212/7204
See application file for complete search history.

(56) References Cited

U.S. PATENT DOCUMENTS

| | | | |
|---|---|---|---|
| 6,230,233 B1 | 5/2001 | Lofgren et al. | |
| 8,010,738 B1* | 8/2011 | Chilton | G11C 16/349 711/103 |
| 8,271,737 B2 | 9/2012 | Chen et al. | |
| 8,370,835 B2 | 2/2013 | Dittmer | |
| 8,560,760 B2 | 10/2013 | Dhokia et al. | |
| 2007/0266200 A1* | 11/2007 | Gorobets | G06F 11/008 711/103 |
| 2008/0126891 A1* | 5/2008 | Danilak | G06F 11/008 714/718 |
| 2011/0264842 A1* | 10/2011 | Nakanishi | G11C 16/349 711/103 |
| 2013/0007380 A1* | 1/2013 | Seekins | G06F 3/0679 711/154 |
| 2013/0238869 A1 | 9/2013 | Jones et al. | |
| 2014/0244899 A1* | 8/2014 | Schmier | G06F 3/0616 711/103 |
| 2015/0178191 A1* | 6/2015 | Camp | G06F 12/0246 711/103 |

* cited by examiner

*Primary Examiner* — Edward Dudek, Jr.
(74) *Attorney, Agent, or Firm* — Suiter Swantz pc llo

(57) ABSTRACT

A system and method for managing the life expectancy of at least one solid state drive (SSD) within a cache device of a storage subsystem includes determining a baseline rate of decline for each SSD based on its guaranteed life expectancy. At intervals, each SSD of the cache device is polled for remaining life and power-on time, and a current rate of decline (based on time since initialization) and a cumulative rate of decline (based on total lifespan of the SSD) is determined. When both the current rate of decline and the cumulative rate of decline exceed the baseline rate of decline for any SSD of the cache device, write requests to that SSD are blocked and redirected to the virtual device until either the current rate of decline or cumulative rate of decline drop below the baseline rate.

19 Claims, 4 Drawing Sheets

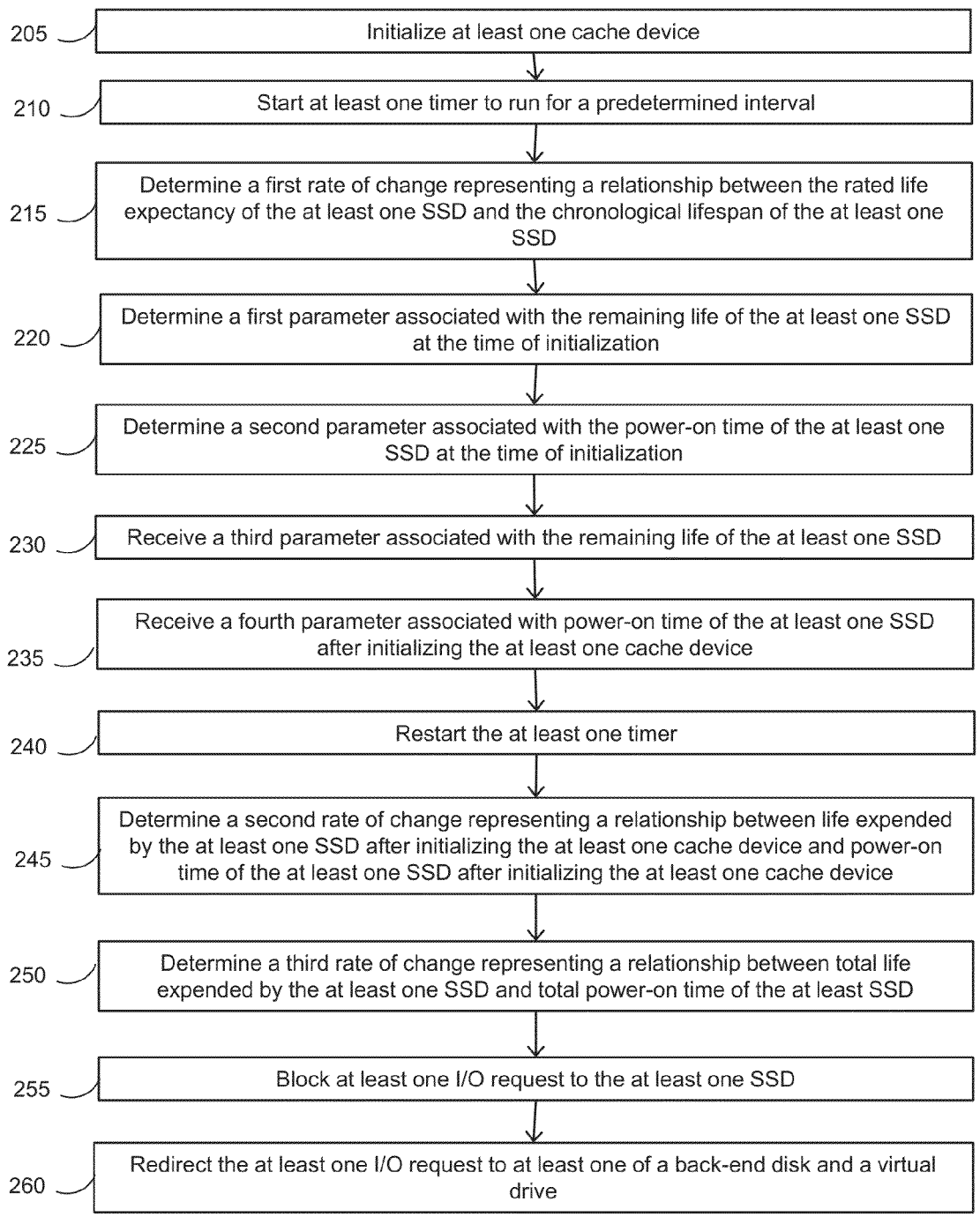

265 — Resume receipt of the at least one I/O request via the at least one SSD

SYSTEM AND METHOD OF LIFE MANAGEMENT FOR LOW ENDURANCE SSD NAND DEVICES USED AS SECONDARY CACHE

TECHNICAL FIELD

Embodiments of the invention relate generally to the use of Flash-based Solid State Drives (SSD) and particularly to the use of SSDs in high availability storage systems.

BACKGROUND

Solid-state disks or drives (SSDs) are frequently used for caching inside a data storage subsystem. Generally the user need not worry about caching algorithms as caching can be managed at the driver level or at the storage/host bus adaptor (HBA) controller level, transparently from the user. Due to the cost of SSD NAND flash memory, consumer multi-level cell (cMLC) or equivalent low-cost, low-endurance NAND options may be adopted for the sake of market competitiveness. If the cMLC SSD is used directly, this is not a problem; the user assumes responsibility for ensuring the SSD will last for the desired period (ex.—lifespan). However, if the cMLC SSD is used transparently for caching inside a storage subsystem, the subsystem then bears responsibility for ensuring a desired lifespan of the SSD, and also that the user will not encounter any major or erratic drop in performance. In addition, the subsystem vendor will not have any control or discretion as to incoming I/O after the point of sale.

As a result, standalone SSD manufacturers may implement a feature known as "life curve throttling". In order to guarantee SSD lifespan, the power-on hours and remaining life of a single SSD are measured, with heavy throttling implemented if the SSD is used faster than allowed. When the SSD is used as a caching device, however, such heavy throttling can severely impair performance. The cache serves as a layer in front of primary storage, and therefore cache performance that is too slow can have a cascading effect on the performance of the entire storage subsystem. Therefore inbuilt SSD throttling is not a viable option for guaranteeing a fixed lifespan (e.g., 3 years) to consumers. If, for example, a heavily throttled or "slow" SSD is used to cache hard disk (HDD) data, any "hot" I/O must deal with two "slow" devices: the HDD and the SSD. It may therefore be desirable to manage SSD endurance (to guarantee a fixed lifespan) without the performance impairments associated with heavy throttling.

SUMMARY

Embodiments of the invention concern a system and method of SSD endurance management that can reduce write operations (ex.—writes) to any SSD within the cache device of a storage subsystem and thus extend the usable life of the SSD and ensure a fixed lifespan as warranted. Because writes to the SSD are the root cause of life erosion, it follows that controlling writes to the SSD can provide a measure of control over the endurance and life left to the SSD. When an SSD is used for caching, writes to the SSD happen in two primary cases. First, when a logical block address (LBA) range, or window, becomes "hot" (i.e., contains frequently accessed data), that range or region is brought to (written to) the SSD. The size of the hot region may be greater than the size of the SSD, or the hot region may move with time. Consequently, new sets of hot windows may continually replace old sets, resulting in sustained SSD writes and consequently decreased endurance. Second, in the case of a write "hit" to a hot window, the resulting "hot write" is terminated on the SSD rather than on the hard drive.

Embodiments of the invention therefore focus on addressing the first case rather than the second. As hotspots move, the corresponding decrease in performance is gradual rather than sudden and drastic. In embodiments, two attributes of the SSD are used as parameters to monitor and ensure the useful life of the SSD. Power-on time, or how long the SSD is powered on, is persistent across boots and the power cycle. Life left is simply the useful life left to the SSD. The measurement of SSD life left accounts for some combination of program/erase (P/E) cycles and Flash block retirement. Most SSDs generally provide this information via some form of custom I/O control (e.g., as self-monitoring attributes such as Power-On Hours and SSDLifeLeft).

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which:

FIG. 3 is a process flow diagram of a method of the invention; and

FIG. 4 is a process flow diagram of a method of the invention.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

In embodiments, a storage subsystem incorporating multiple SSDs according to the invention can implement a concept known as firmware (FW) throttling. FW throttling revolves around measuring the rate of decline of the SSD in real time. For example, the firmware can at fixed intervals (e.g., every 60 minutes) poll the remaining SSD life left in order to measure the current rate of decline, and then take steps to ensure that the rate of decline (ex.—rate of decrement) of SSD life is no greater than a baseline rate that would sustain a new SSD on a pro rata basis for the desired lifespan.

Figure 1:
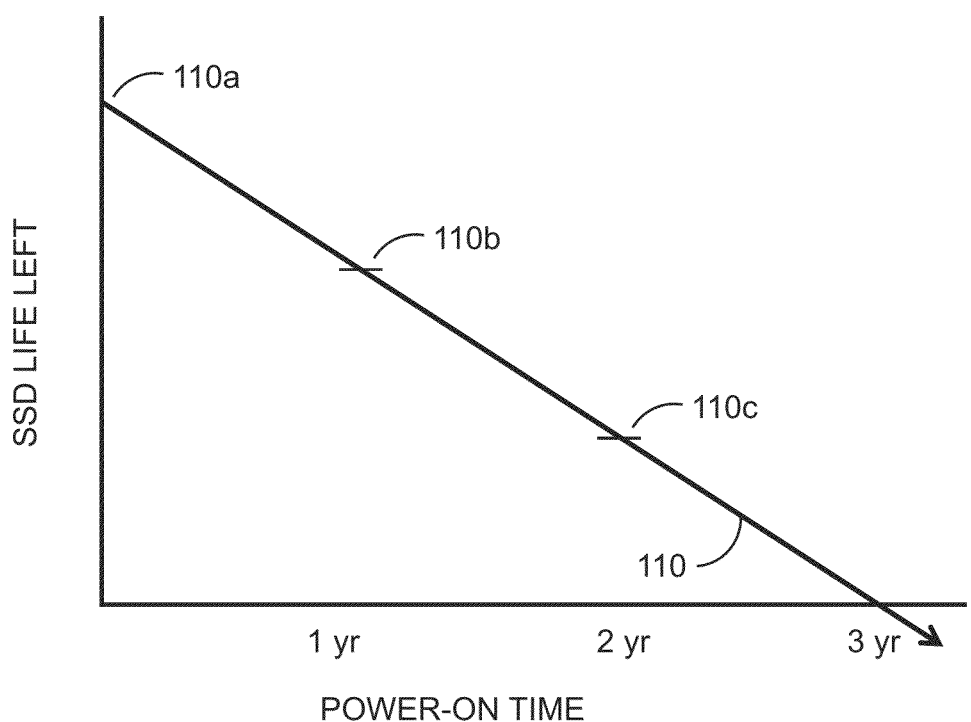
FIG. 1 is a chart illustrating a baseline rate of decline.

For example, referring to FIG. 1, a given SSD may have a rated useful life of 3 years power-on time (≈26,280 hr or 1,576,800 min). At the beginning of its useful life (initial drive deployment, 110a), the SSD clearly has 100 percent of its useful life remaining. If SSD endurance remains constant with the baseline rate of decline no, then two-thirds of the SSD's useful life should remain after one year (110b), and one-third after two years (110c). In embodiments, a storage subsystem according to the invention can take action to prevent any individual SSD within the cache device from declining (in endurance) at a rate greater than the baseline rate 110.

In embodiments, a baseline rate of decline 110 can be calculated as a simple linear function indicating a baseline value for SSD life left for any corresponding amount of power-on time. For example, if the rated useful life is 3 years, the SSD should normally lose about 0.0063 percent of its useful life for every minute of power-on time:

$$BaselineRateOfDecline = \frac{100.000\%}{1,576,800 \text{ min}} = 0.00006341958 \gg 63.420$$

This rate can be naturalized to represent a large integer (e.g., 63.420) with enough resolution to capture nuances where life left can be expressed to a precision of 3 decimal points (e.g., 80.123% life left).

In embodiments, a cache device may incorporate one or more SSD devices configured for a standard RAID level (RAID 0, RAID 1, etc.). When a cache device is thus created, or firmware reboots with a cache device, the storage subsystem firmware may define this as a "start of day" and stop any life monitoring threads already in progress. In embodiments, the firmware may then iterate through every SSD in the caching device and define each necessary variable through any appropriate combination of SSD life left and power-on time. For example, in embodiments NVal may represent the percentage of SSD life left (from 0.000 to 1.000), LifeAtStart(i) may represent the life left at the start of day for $SSD_i$ (normalized to a range of 0.000 to 100.000), and PowerOnMinsAtStart(i) may represent the total minutes in power elapsed for $SSD_i$ at a start of day. In embodiments, at a start of da, the firmware may also start a life monitor timer (cycling at intervals of e.g., 60 minutes) for monitoring SSD life and taking appropriate throttling action.

In embodiments, within the life monitor timer firmware may monitor both current and cumulative rates of SSD endurance decline. For example, in embodiments firmware may iterate through every SSD in the caching device and define additional variables including (but not limited to) LifeLeftNow(i), representing the life remaining to $SSD_i$ at the time of iteration (normalized to a range of 0.000 to 100.000) and PowerOnMinsNow(i), representing the total minutes in power elapsed for $SSD_i$ at the time of iteration. In embodiments, a current rate of decline (relative to the time elapsed since the last iteration) may then be calculated, e.g.:

$$CurrentRateOfDecline\ (i) = $$
$$\frac{LifeAtStart(i) - LifeLeftNow(i)}{PowerOnMinsNow(i) - PowerOnMinsAtStart(i)}$$

and a cumulative rate of decline (relative to the lifespan of the SSD) may be calculated, e.g.:

$$\text{Cumulative Rate Of Decline}\ (i) = \frac{100 - LifeLeftNow(i)}{PowerOnMinsNow(i)}$$

In embodiments, if both the current rate of decline and the cumulative rate of decline for any SSD of a cache device exceed the baseline rate of decline for that SSD, window creation may be stopped for that SSD until the trigger conditions no longer apply. In embodiments, window creation refers to the writing of LBA ranges identified as hot data to the SSD. For example, in embodiments $SSD_i$ (with a rated lifespan of 3 years and thus a baseline rate of 63.420, as outlined above) starts a day with 72.548% life left (NVal=0.72548; LifeAtStart(i)=72.548) and 441,500 total power-on minutes. In embodiments, after 60 minutes (or any other desired interval) the firmware may iterate through every SSD polling for life left and power-on minutes. In embodiments, $SSD_i$ may return a life left of 0.71996 (LifeLeftNow(i)=71.996) and 441560 power-on minutes, reflecting extremely heavy use. Calculation by the example methods outlined above may indicate a current rate of decline far above the baseline:

$$CurrentRateOfDecline\ (i) = $$
$$\frac{72.548 - 71.996}{441,560 - 441,500} = \frac{0.552}{60} = 0.0092 \gg 9200.000$$

and a cumulative rate of decline slightly below the baseline:

$$CumulativeRateOfDecline\ (i) = $$
$$\frac{100 - 71.996}{441,560} = \frac{28.004}{441,560} = 0.00006342092 \gg 63.421$$

In embodiments, when both the current rate of decline and the cumulative rate of decline are in excess of the baseline rate of decline (here, 63.420), the trigger conditions have been met and window creation can be stopped. In embodiments, the caching firmware or driver may stop cache churning by hafting write requests of LBA ranges identified as hot data (ex.—creation of new cache windows) while maintaining existing cache windows (ex.—processing read requests to the SSD). In embodiments, should an LBA range become "hot" under these conditions, it may not be brought into the SSD as would normally be the case. Instead, the corresponding I/O request may bypass the SSD and proceed to the back-end disk or hard drive. However, all I/O requests that "hit" existing cache windows (e.g., read requests) may still be served by the SSD. Referring back to the above example, in embodiments the firmware may poll all SSDs once more for life left and power-on time after 60 minutes more have elapsed. In embodiments, if $SSD_i$ continues to return a life left of 71.996 due to lack of write endurance activity, the current rate of decline may still be far in excess of the baseline:

$$CurrentRateOfDecline\ (i) = $$
$$\frac{72.548 - 71.996}{441,620 - 441,500} = \frac{0.552}{120} = 0.0046 \gg 4600.000$$

while the cumulative rate of decline may be slightly under the baseline rate:

$$CumulativeRateOfDecline\ (i) = $$
$$\frac{100 - 71.996}{441,620} = \frac{28.004}{441,620} = 0.00006341198 \gg 63.412$$

In embodiments, when both current and cumulative rates of decline do not exceed the baseline rate (e.g., either the current rate or the cumulative rate is below the baseline rate), normal window creation may be resumed until the triggering conditions are again met for any SSD in the cache device. In some embodiments, stopping window creation may be triggered by a flag that persists until both rates of decline are over the baseline for that SSD, at which point the flag can be reset by the firmware.

Endurance-related problems due to cache churn are due primarily to "read-fill" requests, where hot data is brought into an SSD from the hard drive in response to a hot read request, because each read-fill request generates a write to the SSD. In embodiments, a storage subsystem according to the invention can maintain existing cache windows and cache lines, serving only read requests to the SSD and host writes to the hard drive, neither of which affect write endurance. Some read-fills may occur whereby invalid sub-cachelines of existing cachelines are filled, but these occurrences will gradually decrease and stop. Similarly, a negligible amount of SSD writes may be generated by cache window metadata updates as a result of bypass I/O, but these instances will also decrease and stop when window churn ceases.

Figure 2A:
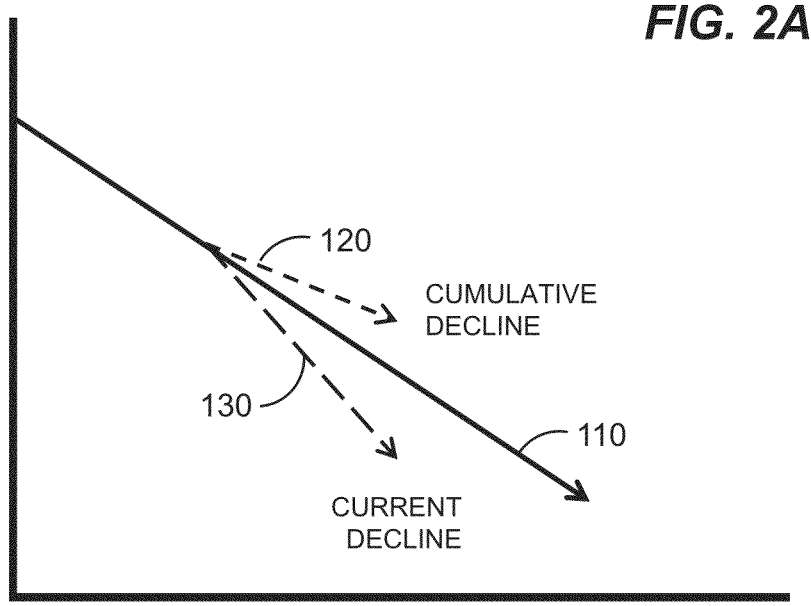
FIG. 2A is a chart comparing current and cumulative rates of decline to a baseline rate.
Figure 2B:
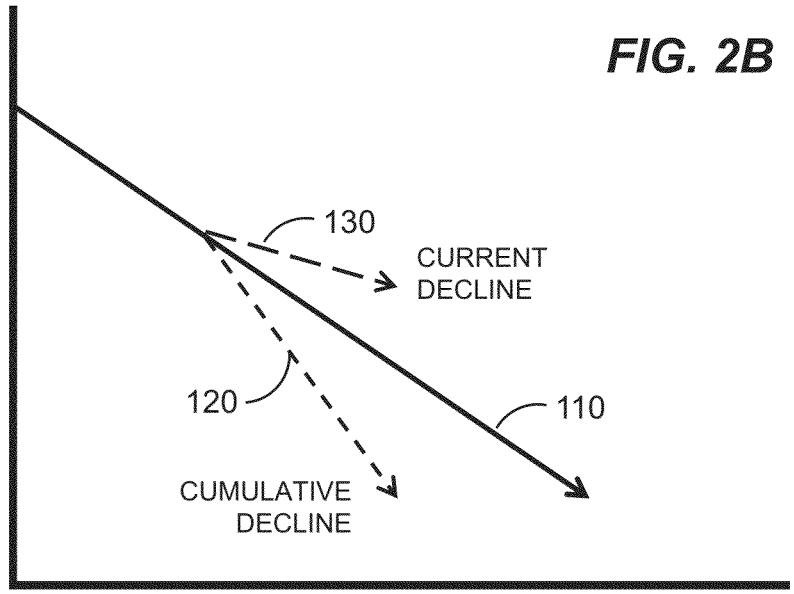
FIG. 2B is a chart comparing current and cumulative rates of decline to a baseline rate.

FIGS. 2A and 2B illustrate conditions where one rate of decline may exceed the baseline rate where the other rate of decline does not. In embodiments, stopping window creation may be unnecessary where only one rate of decline (current or cumulative) exceeds the baseline rate 110. Referring to FIG. 2A, in embodiments when the cumulative rate of decline 120 exceeds the baseline rate 110 but the current rate of decline 130 does not, while the SSD may have been subjected to high endurance write usage in the past (e.g., as a direct disk) current usage may not be excessive and does not threaten the guaranteed pro rata lifespan of the SSD. Therefore, there may be no rationale for impairing present performance simply because of past endurance. In the case of an excessively worn SSD, however, frequent I/O disruption may result in excessive delay. Referring to FIG. 2B, in embodiments when the current rate of decline 130 exceeds the baseline rate 110 but the cumulative rate of decline 120 does not, the disparity may be explained by load peaks on the part of the particular SSD at certain points of the day, while at other points there may be little or no load. Whatever the ultimate reason, the SSD has enough life left to meet its rated life capacity and, as in FIG. 2A, there may also be no rationale for throttling.

In embodiments, the result of stopping window churn (ex.—creation of new windows, writing hot data to the SSD) will be to dramatically reduce endurance load on the target SSD in the short term, providing the SSD with time to recover. Minor drops in performance may occur due to reduction of cache hit ratio caused by a moving hotspot. For example, assuming a cache device size 30% the size of the source back-end disk and random I/O requests, in embodiments a 30% cache hit ratio should persist even when window creation stops. Nor will stopping window creation affect the flushing of dirty cache windows.

FIG. 3 illustrates a process flow diagram of a method 200 for managing the life expectancy of at least one solid state drive (SSD) in a storage subsystem according to an embodiment of the invention. It is noted herein that the method 200 may be carried out utilizing any of the embodiments described previously. It is further noted, however, that method 200 is not limited to the components or configurations described previously as multiple components and/or configurations may be suitable for executing method 200.

At step 205, the method 200 initializes at least one cache device incorporating the at least one SSD. In embodiments, the at least one cache device may incorporate the at least one SSD in at least one standard RAID configuration. In embodiments, the firmware level of the storage subsystem may terminate any ongoing threads monitoring the life expectancy of the at least one SSD upon initialization of the at least one cache device. At step 210, the method 200 starts at least one timer to run for a predetermined interval. In embodiments, the predetermined interval may be sixty minutes. At step 215, the method 200 determines a first rate of change representing a relationship between the rated life expectancy of the at least one SSD and the chronological lifespan of the at least one SSD. In embodiments, the first rate of change may be derived from at least one self-monitoring attribute of the at least one SSD. In embodiments, the first rate of change may be a linear function representing a constant decline in life expectancy. At step 220, the method 200 determines a first parameter associated with the remaining life of the at least one SSD at the time of initialization. At step 225, the method 200 determines a second parameter associated with the power-on time of the at least one SSD at the time of initialization. At step 230, when the at least one timer expires, the method 200 receives a third parameter associated with the remaining life of the at least one SSD. At step 235, the method 200 receives a fourth parameter associated with power-on time of the at least one SSD after initializing the at least one cache device. At step 240, the method 200 restarts the at least one timer. In embodiments, at least one of the first parameter, the second parameter, the third parameter and the fourth parameter may be a self-monitoring attribute of the at least one SSD. At step 245, the method 200 determines a second rate of change representing a relationship between life expended by the at least one SSD after initializing the at least one cache device and power-on time of the at least one SSD after initializing the at least one cache device. At step 250, the method 200 determines a third rate of change representing a relationship between total life expended by the at least one SSD and total power-on time of the at least SSD. At step 255, when both the second rate of change and the third rate of change are greater than the first rate of change, the method 200 blocks at least one I/O request to the at least one SSD. In embodiments, the at least one I/O request may be a write request associated with an LBA range identified as frequently accessed data At step 260, the method 200 redirects the at least one I/O request to at least one of a back-end disk and a virtual device.

Referring to FIG. 4, the method 200 as illustrated by FIG. 3 may have an additional step 265. At step 265, when either the second rate of change or the third rate of change is not greater than the first rate of change, resuming receipt of the at least one I/O request via the at least one SSD.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A method for managing the life expectancy of at least one solid state drive (SSD) in a storage subsystem, comprising:
   initializing at least one cache device including the at least one SSD;
   determining a first rate of change representing a relationship between the rated life expectancy of the at least one SSD and the chronological lifespan of the at least one SSD;
   determining a first parameter associated with the remaining life of the at least one SSD;
   determining a second parameter associated with the power-on time of the at least one SSD;
   starting at least one timer to run for a predetermined interval,
   when the at least one timer expires, determining a third parameter associated with the remaining life of the at least one SSD, determining a fourth parameter associated with power-on time of the at least one SSD after initializing the at least one cache device, and restarting the at least one timer;
   determining a second rate of change representing a relationship between life expended by the at least one SSD after initializing the at least one cache device and power-on time of the at least one SSD after initializing the at least one cache device;
   determining a third rate of change representing a relationship between total life expended by the at least one SSD and total power-on time of the at least SSD; and
   when both the second rate of change and the third rate of change are greater than the first rate of change:
      blocking at least one I/O request to the at least one SSD, and
      redirecting the at least one I/O request to at least one of a back-end disk and a virtual device.

2. The method of claim 1, wherein the at least one I/O request is a write request associated with an LBA range identified as frequently accessed data.

3. The method of claim 1, wherein the first rate of change is derived from at least one self-monitoring attribute of the at least one SSD.

4. The method of claim 1, wherein at least one of the first parameter, the second parameter, the third parameter and the fourth parameter is a self-monitoring attribute of the at least one SSD.

5. The method of claim 1, further comprising:
   when either the second rate of change or the third rate of change is not greater than the first rate of change, resuming receipt of the at least one I/O request via the at least one SSD.

6. The method of claim 1, wherein the first rate of change is a linear function representing a constant decline in life expectancy.

7. The method of claim 1, wherein the predetermined interval is 60 minutes.

8. A system for managing the life expectancy of at least one solid state drive (SSD) in a storage subsystem, comprising:
   at least one cache device incorporating the at least one SSD;
   at least one of a back-end disk and a virtual device;
   at least one timer configured to run for a predetermined interval; and
   a firmware level operably coupled to the at least one SSD and configured to
      (a) initialize the at least one cache device;
      (b) start the at least one timer;
      (c) determine a first rate of change representing a relationship between the rated life expectancy of the at least one SSD and the chronological lifespan of the at least one SSD;
      (d) determine a first parameter associated with the remaining life of the at least one SSD at the time of initialization;
      (e) determine a second parameter associated with the power-on time of the at least one SSD at the time of initialization;
      (f) when the at least one timer expires, receive a third parameter associated with the remaining life of the at least one SSD, receive a fourth parameter associated with power-on time of the at least one SSD after initializing the at least one cache device, and restart the at least one timer;
      (g) determine a second rate of change representing a relationship between life expended by the at least one SSD after initializing the at least one cache device and power-on time of the at least one SSD after initializing the at least one cache device;
      (h) determine a third rate of change representing a relationship between total life expended by the at least one SSD and total power-on time of the at least SSD; and
      (i) when both the second rate of change and the third rate of change are greater than the first rate of change:
         Nock at least one I/O request to the at least one SSD, and redirect the at least one I/O request to at least one of a back-end disk and a virtual device.

9. The system of claim 8, wherein the at least one I/O request is a write request associated with an LBA range identified as frequently accessed data.

10. The system of claim 8, wherein the firmware level is configured to determine at least one of the first rate of decline, the first parameter, the second parameter, the third parameter, and the fourth parameter from at least one self-monitoring attribute of the SSD.

11. The system of claim 8, wherein the firmware level is further configured to terminate any ongoing threads monitoring the life expectancy of the at least one SSD at initialization of the at least one cache device.

12. The system of claim 8, wherein the firmware level is further configured to when either the second rate of change or the third rate of change is not greater than the first rate of change, resume receipt of the at least one I/O request via the at least one SSD.

13. The system of claim 8, wherein the at least one cache device incorporates the at least one SSD in at least one standard RAID configuration.

14. A data storage subsystem including a system for managing the life expectancy of at least one solid state drive (SSD) in a storage subsystem, comprising:
   at least one cache device incorporating the at least one SSD;
   at least one of a back-end disk and a virtual device;
   at least one timer configured to run for a predetermined interval; and
   a firmware level operably coupled to the at least one SSD and configured to
   (a) initialize the at least one cache device;
   (b) start the at least one timer;
   (c) determine a first rate of change representing a relationship between the rated life expectancy of the at least one SSD and the chronological lifespan of the at least one SSD;
   (d) determine a first parameter associated with the remaining life of the at least one SSD at the time of initialization;
   (e) determine a second parameter associated with the power-on time of the at least one SSD at the time of initialization;
   (f) when the at least one timer expires, determine a third parameter associated with the remaining life of the at least one SSD, determine a fourth parameter associated with power-on time of the at least one SSD after initializing the at least one cache device, and restart the at least one timer;
   (g) determine a second rate of change representing a relationship between life expended by the at least one SSD after initializing the at least one cache device and power-on time of the at least one SSD after initializing the at least one cache device;
   (h) determine a third rate of change representing a relationship between total life expended by the at least one SSD and total power-on time of the at least SSD; and
   (i) when both the second rate of change and the third rate of change are greater than the first rate of change: block at least one I/O request intended for the at least one SSD, and redirect the at least one I/O request to at least one of a back-end disk and a virtual device; and
   (j) when either the second rate of change or the third rate of change is not greater than the first rate of change, resume receipt of the at least one I/O request via the at least one SSD.

15. The data storage subsystem of claim 14, wherein the at least one I/O request is a write request associated with an LBA range identified as frequently accessed data.

16. The data storage subsystem of claim 14, wherein the firmware level is configured to determine at least one of the first rate of decline, the first parameter, the second parameter, the third parameter, and the fourth parameter from at least one self-monitoring attribute of the SSD.

17. The data storage subsystem of claim 14, wherein the firmware level is further configured to terminate any ongoing threads monitoring the life expectancy of the at least one SSD at initialization of the at least one cache device.

18. The data storage subsystem of claim 14, wherein the firmware level is further configured to
   when either the second rate of change or the third rate of change is not greater than the first rate of change, resume receipt of the at least one I/O request via the at least one SSD.

19. The data storage subsystem of claim 14, wherein the at least one cache device incorporates the at least one SSD in at least one standard RAID configuration.

* * * * *